United States Patent [19]

Schy

[11] 3,946,655
[45] Mar. 30, 1976

[54] TACO SHELL COOKING APPARATUS
[76] Inventor: Frank R. Schy, 1659 Borden, San Mateo, Calif. 94403
[22] Filed: Oct. 15, 1974
[21] Appl. No.: 514,795

[52] U.S. Cl. .................. 99/404; 99/407; 99/427; 99/443 C
[51] Int. Cl.² ........................................ A47J 37/12
[58] Field of Search ............ 99/404, 353, 403, 407, 99/426–427, 428, 430–431, 439–440, 441–442, 443

[56] References Cited
UNITED STATES PATENTS

| | | | |
|---|---|---|---|
| 3,309,981 | 3/1967 | Benson et al. | 99/407 X |
| 3,667,372 | 6/1972 | Hilvitz et al. | 99/404 |
| 3,785,273 | 1/1974 | Stickle | 99/404 |
| 3,861,289 | 1/1975 | Baker et al. | 99/404 |

FOREIGN PATENTS OR APPLICATIONS

| | | | |
|---|---|---|---|
| 265,443 | 10/1913 | Germany | 99/431 |

Primary Examiner—Robert W. Jenkins
Assistant Examiner—Arthur O. Henderson
Attorney, Agent, or Firm—Schatzel & Hamrick

[57] ABSTRACT

Taco shell forming and cooking apparatus comprising a cooking bath, a mesh conveyor belt for carrying a tortilla through the cooking bath, a plurality of wedge-shaped forming members disposed above the bath and guide means for causing the forming members to sequentially engage the conveyor belt and deform the tortilla and tortilla-carrying portions of the belt into a taco shell configuration. The forming mechanism is driven by an electric motor and in turn drives the conveyor belt as the forming members engage and deform the belt.

11 Claims, 4 Drawing Figures

Fig_1

TACO SHELL COOKING APPARATUS

BACKGROUND OF THE INVENTION

1. Field of the Invention

The present invention relates generally to food product cooking devices and more particularly, to an improved taco shell cooking apparatus which forms the tortilla material and maintains it in the predetermined configuration during a subsequent cooking operation.

2. Discussion of the Prior Art

Taco shell cooking devices of various types have been known and used for many years. Among the various types which have been utilized heretofore are those disclosed in the U.S. Pat. Nos. to Saenz 2,967,474; Ford 2,967,474; Yepies 3,267,836; Schy 3,570,393; Schy 3,763,764; and Stickle 3,785,273. Each of these devices relates to a means for forming and cooking a tortilla so that it may be utilized in the preparation of tacos or similar food products. However, the first three devices suffer from the disadvantage that they require very careful individual loading and do not adequately protect the shell against damage either during or after the cooking operation. This means that the apparatus can not be easily incorporated into an automated production line.

The devices disclosed in the Schy patents relate to earlier designs made by the inventor of the present invention. Improvements in the present invention over the former are embodied in apparatus simplifications which result in the use of fewer parts, in greater ease of construction, in increased reliability and reduced maintenance, and in a more compact apparatus.

The device disclosed in the Stickle patent, although somewhat similar in configuration to the present invention, suffers from numerous disadvantages. The principal disadvantage is that the movement of the belt and the carried food product through cooking oil requires a rather complex mechanism which is subject to a relatively high degree of wear and deterioration, frequent jamming and costly maintenance. In addition, the movement through the cooking bath is not continuous and the food product must be dropped between the molds.

SUMMARY OF THE PRESENT INVENTION

It is therefore a primary objective of the present invention to provide a novel taco shell cooking and forming apparatus which forms a tortilla in a smooth continuous process as it is introduced into a cooking bath and then protects it from injury as it is carried through the cooking operation.

Another objective of the present invention is to provide a simply constructed, reliable and easily maintained apparatus of the type described without sacrificing cooking speed.

Still another objective of the present invention is to provide an apparatus of the type described which is readily suitable for use in an automated process line.

Briefly, a preferred embodiment of the present invention includes a continuous, mesh conveyor belt which is drawn through a cooking bath while being deformed in a predetermined manner, and a series of wedge-shaped forming members connected together to form a belt deforming chain disposed above the mesh conveyor belt. Drive means are provided for sequentially driving the forming members into engagement with a portion of the mesh belt to deform it into a trough like configuration as it enters the cooking bath. A food product in sheet form placed on the conveyor belt at an in-feed position in advance of the mating engagement will thus be formed as it and the belt are engaged by a particular forming member, and will be cooked as it is thereafter drawn through the cooking bath in the formed configuration. Upon emerging from the bath, the forming member is separated from the mesh belt and the shaped and cooked food product is then discharged from the forming member back onto the mesh belt transportation by the belt to an out-feed position.

In accordance with the present invention, the wedge-shaped forming members maintain their shape throughout the forming, cooking and return portions of the cycle and are thus not subject to jamming, pivot breakage, wear, etc. Moreover, the mesh conveyor, while being deformed during the forming and cooking stages of the operative cycle, does not require complex springloaded articulated segments or the like, and its inherent flexibility allows it to be deformed and straightened repeatedly with little or no wear resulting.

Another important advantage of the present invention is that due to its mechanical simplicity it can be manufactured relatively inexpensively and can be easily cleaned and serviced.

Still other advantages of the present invention will no doubt become apparent to those skilled in the art after having read the following detailed description of a preferred embodiment which is illustrated in the several figures of the drawing.

IN THE DRAWING

DETAILED DESCRIPTION OF THE PREFERRED EMBODIMENT

Figure 1:
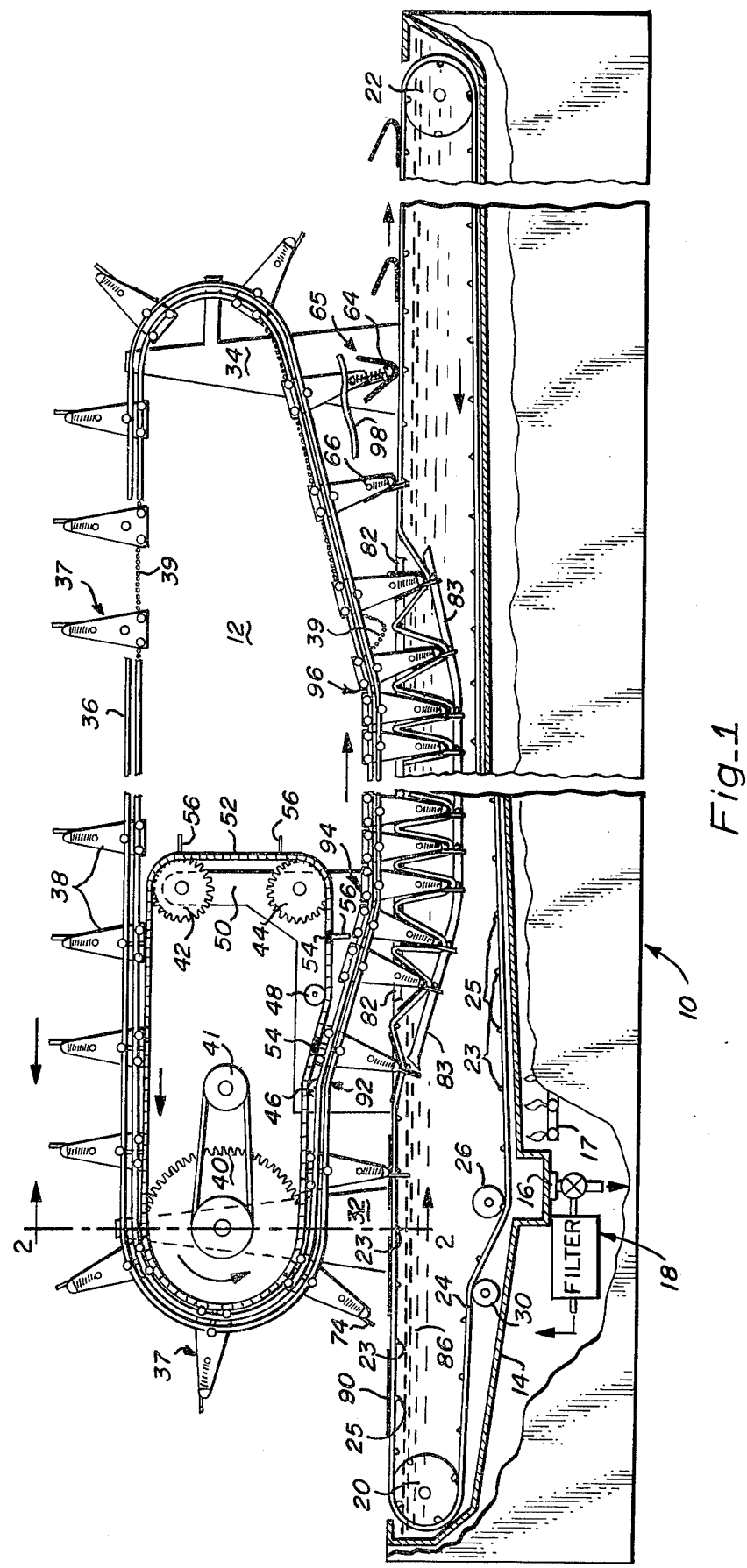
FIG. 1 is a partially broken side view showing the principal operative components of a taco shell cooking apparatus in accordance with the present invention.

Referring now to FIG. 1 of the drawing, the illustrated preferred embodiment is shown to include a base portion depicted in broken away schematic form at 10 and a forming mechanism shown generally at 12. The base portion 10 includes a cooking chamber in the form of an elongated tank 14 having a bottom sloping from both ends toward a drain 16. A suitable electric or gas heating means 17 is disposed beneath the tank 14 for heating a quantity of oil contained therein to form a cooking bath. A sediment trap, suitable drain and recirculatory plumbing, and oil filtering apparatus are shown schematically at 18.

Disposed within tank 14 at the in-feed end is an idler roller or pulley 20. Disposed at the out-feed end of tank 14 is a similar idler roller or pulley 22. Wrapped about the pulleys 20 and 22 is a wire mesh conveyor belt or web 24. An idler pulley 26 is disposed in the bottom portion of the tank 14 near the drain opening 16 and is positioned so as to cooperate with pulley 22 to cause the returning portion of belt 24 to move leftwardly as illustrated and along the bottom surface of tank 14. A second idler pulley 30 is positioned between pulley 20 and idler pulley 26 and is vertically adjustable to take up slack in belt 24. Although it is not necessary that belt 24 be driven by either pulley 20 or pulley 22, as will be explained in more detail below, either or both of these pulleys may be driven to reduce the tension in belt 24.

Figure 3:
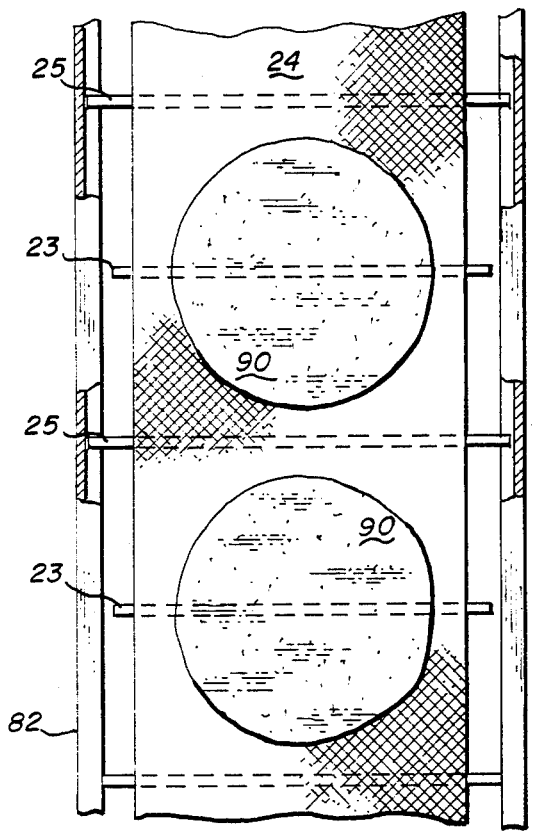
FIG. 3 is a partial top view showing a portion of the mesh belt at the in-feed end of the apparatus shown in FIG. 1.

Belt 24 has a plurality of rods 23 and 25 alternatingly affixed to its inside surface at equally spaced intervals. As is shown in FIG. 3, the length of the rods 23 are slightly longer than the width of belt 24, and the length of the rods 25 is longer than that of rods 23 for reasons which will be explained below.

Affixed to each side of body 10 are stanchions 32 and 34 which support the respective ends of a pair of generally oval-shaped tracks 36. In the preferred embodiment the tracks 36 are disposed one above each side of tank 14 and are comprised of two parallel stainless steel rods welded to spacer blocks 31 (see FIG. 4) disposed along the track at spaced intervals. The lower portion of each track is deflected downwardly as illustrated. Slideably mounted upon and spanning between the left and right side tracks 36 are a plurality of wedge-shaped forming members 38 which, as will be explained in more detail below, are attached to each other by pairs of bead chains 39 or the like, so as to form a continuous forming chain 37 of forming members 38.

Also carried by stanchion 32 are a pair of sprocket wheels 40 having an outer diameter slightly smaller than the inside diameters of the correspondingly curved ends of tracks 36. Sprockets 40 are driven by a motor 41.

Positioned to the right of sprocket 40, as illustrated in FIG. 1, are two pairs of idler sprockets 42 and 44. Located between sprockets 40 and 44 are a pair of chain-tracking idler sprockets 46 and 48. Sprockets 42–48 are all supported by a pair of side plates 50 disposed one on each side of tank 14. Wrapped about the sprockets 40–48 are a pair of drive chains 52 which are driven by sprockets 40. As indicated in the drawing, the several sprockets 40–48 are positioned so as to cause the paths taken by chains 52 to parallel the adjacent portions of tracks 36.

A plurality of transversely disposed bars 54 (see FIG. 2) are equally spaced along the chain lengths with their respective ends coupled to the chains. The spacing of bars 54 around chains 52 corresponds to the spacing between the forming members 38 when stretched apart to the limit permitted by the bead chains 39. Affixed to each of the bars 54 are a plurality of outwardly projecting drive fingers 56 which engage the forming members and drive them along tracks 36.

Figure 2:
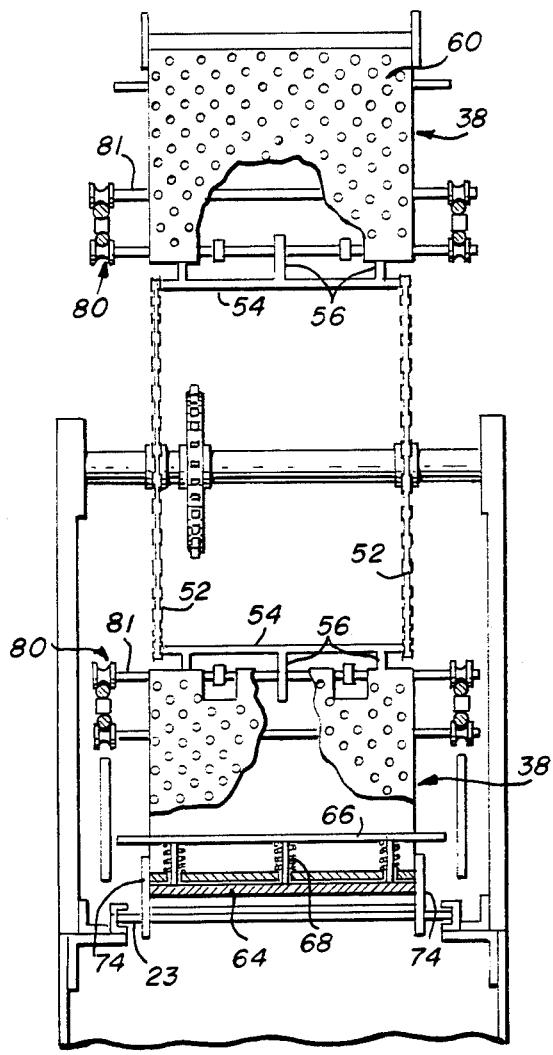
FIG. 2 is a partially borken transverse cross-section taken along the line 2—2 of FIG. 1.
Figure 4:
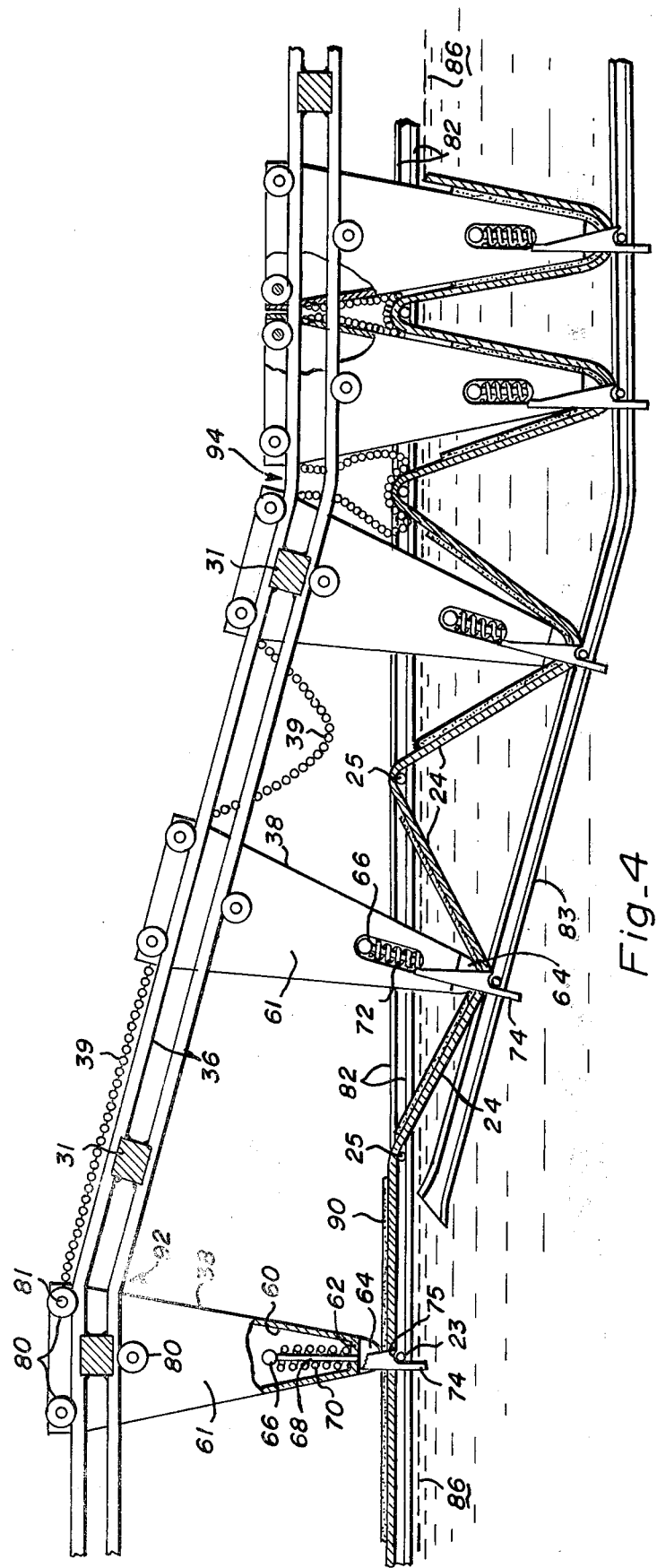
FIG. 4 is an enlarged partially-broken partial side view of the apparatus shown in FIG. 1 illustrating the taco shell forming operation.

In FIGS. 2 and 4, it will be noted that each wedge-shaped forming member 38 is comprised of a folded sheet 60 of perforated metal, preferably stainless steel, a pair of end plates 61, and a half-round nose bar 64. At the fold, the sheet 60 is flattened to form a member 62 having a flat surface with the base of the nose bar 64. The rounded outer surface of the bar 64 cooperates with the perforated sheet to form the apex of a generally U-shaped mold for shaping a tortilla into the taco shell configuration. Bar 66 is disposed within the member 38 and in parallel with bar 64, and is affixed to bar 64 by three rods 68 that extend through apertures in the member 62. Positioned about rods 68 are coil springs 70 which bear against bar 66 and the inside surface of member 62 to urge the nose bar 64 into a retracted position in contact with the outside surface of member 62. When bar 66 is urged downwardly and moves in the slots 72 (in sidewalls 61) against the force of springs 70, the nose bar 64 will be extended outwardly from the member 62 and then be returned to the retracted position when the urging force is released.

Also affixed to each end of the forming member 38 is a downwardly projecting indexing finger 74 which extends beneath the side of mesh belt 24 to engage the rod 23. Fingers 74 are provided with a shoulder 75 for bearing against the rod 23 to maintain a predetermined spacing between the mesh belt 24 and the nose bar 64. This spacing prevents the tortilla from being crushed between the belt and nose bar during the forming operation.

Each forming member 38 is mounted to the track 36 by rollers 80 mounted on three shafts 81, two of which are positioned along the base of the forming member so that their rollers 80 engage one side of track 36, and the third shaft is disposed along the center line of member 38 so that its rollers engage the other side of track 36. With this triangular track engaging configuration, the members 38 are insured of always being positioned normal to the track 36 as they move therealong.

Extending along each side of the path taken by belt 24 as it moves from the top of pulley 20 to the top of pulley 22 are a pair of upper rails 82 and a pair of lower rails 83 which are partially shown in FIG. 1. Rails 82 receive the ends of rods 25 and cause them to follow a horizontal path along the top of tank 14 to accomodate the belt-forming operation to be explained below. Rails 83 receive the ends of rods 25 and cooperate with the fingers 64 to cause belt 24 to fold over the member 38.

In operation, tank 14 is filled with a predetermined quantity of cooking oil which brings the cooking bath to a level of about that shown in FIGS. 1 and 4 by the dashed lines 86. The oil is then heated to a predetermined cooking temperature by heating means 17 and motor 41 is actuated to cause chains 52 to begin moving over the sprockets 40–48 at a predetermined speed. As the chains roll over sprockets 42, the fingers 56 engage the members 38 causing the forming chain 37 to be moved along track 36. Similarly, as members 38 round the in-feed end of track 36, their indexing fingers 74 engage rods 23 and drivingly cause belt 24 to move therewith.

Once the apparatus is started, and is up to speed, tortillas 90 may be placed upon belt 24 at the in-feed end directly above the rods 23 for transport into the cooking bath. As the belt 24 moves rightwardly and each forming member 38 passes beneath sprocket 40, the indexing fingers 74 will extend along the sides of the belt and engage the corresponding rod 23 as illustrated. As the fingers 74 engage the corresponding rod 23, nose bar 64 will be positioned immediately above the center of a tortilla 90 so that as the forming member 38 passes the downwardly turning bend 92 in track 36, the adjacent portions of belt 24 and the tortilla 90 will be folded about the forming member as it continues to move downwardly. Note that the rods 25 will remain in engagement with rails 82 and will thereby aid in folding belt 24 around the members 38. The ends of rods 23 will also track along the rails 83. Rails 83 are not necessary elements of the apparatus but may be used as an aid in the forming operation.

Before a particular member 38 reaches a second bend 94 in track 36 the fingers 56 are lifted out of engagement with the upper portion of the member leaving it temporarily motionless. However, as the following forming member 38 is driven forward it will engage the preceding member and cause it to be moved forward until the fingers 56 are raised out of engagement with the driven member.

By the time member 38 reaches the second bend 94 in track 36, the tortilla will be formed into the desired taco shell configuration and will thereafter continue through the cooking oil for a period selected to insure that the tortilla is fully cooked by the time that the forming member reaches a third bend 96 in track 36. After passing bend 96 each forming member is pulled upwardly out of the bath as the connecting chains 39 tighten. The tension in belt 24 causes it to follow and separate from member 38.

As the belt and forming member separate, the now cooked taco shell may drop off onto belt 24 or it may remain wrapped about member 38. In order to insure that each shell is discharged from the forming members, discharging cams 98 are provided on stanchion 34 which are engaged by the ends of bar 66 as the forming member passes. As bar 66 passes under cam 98, nose bar 64 is extended away from the forming member as shown at 65 in FIG. 1, and is then quickly retracted as it falls off the end of the cam thereby ejecting the taco shell. The ejected shells fall onto belt 24 and are carried thereby to an out-feed position near pulley 22 where they are removed for packaging.

Although only a single line cooking apparatus has been illustrated, many like mechanisms can be combined in side-by-side arrangement to pass through either a common cooking vessel or individual cooking vessels so as to increase the number of cooked articles which may be produced in a given time. Moreover, although the particular apparatus disclosed has been directed to an embodiment for forming and cooking taco shells, it is to be understood that the forming members can be adapted to form any other type of material in any other similar configuration, and the invention is not limited to forming U-shaped articles. Furthermore, neither is the apparatus limited to food product immersion cooking applications since the same apparatus can be used to heat form, by radiant heating as well as immersion heating processes, many other types of sheet materials such as soft metals, synthetics, plastics and the like.

After having read the above detailed disclosure of a preferred embodiment, it is contemplated that many alterations and modifications of the invention will become apparent to those skilled in the art. Accordingly, it is intended that the appended claims be interpreted as covering all such modifications as fall within the true spirit and scope of the invention.

What is claimed is:

1. Taco shell forming and cooking apparatus, comprising:
    means forming a cooking chamber;
    conveyor means including a continuous deformable web for carrying tortillas from an in-feed position through said cooking chamber to an out-feed position, said web including a mesh belt having a plurality of rods disposed transverse to the length of said belt, said rods being affixed to said belt at predetermined intervals and extending beyond the edges of the belt on both sides;
    forming means including a continuous chain of individual forming members disposed above said chamber, each of said forming members including an elongated wedge-shaped element having its longitudinal dimension directed transverse to the length of said belt, each of said forming members further including indexing fingers disposed proximate the ends thereof and projecting therefrom for engaging certain ones of said rods to drive said belt with said forming members as they pass from said in-feed position to said out-feed position; and
    guide means for sequentially guiding each of said forming members into engagement with said belt and for causing a tortilla-carrying portion of said belt to wrap the tortilla about the forming member during the time that the tortilla is carried through said cooking chamber, said guide means including guide rails disposed within said cooking chamber for causing certain other ones of said rods to follow a predetermined path in moving from said in-feed position to said out-feed position to aid in the wrapping of a tortilla-carrying portion about the forming member.

2. Taco shell forming and cooking apparatus as recited in claim 1 wherein said guide means further includes a pair of tracks for constraining said forming members to follow a predetermined path and to have a predetermined orientation at each point along said path.

3. Taco shell forming and cooking apparatus as recited in claim 2 wherein said forming means includes drive means for engaging certain ones of said forming members to cause said chain of forming members to be driven around said tracks.

4. Taco shell forming and cooking apparatus as recited in claim 3 wherein each of said wedge-shaped elements includes a nose bar extending along its apex and means for intermittently separating said nose bar from the remainder of the wedge-shaped element to discharge a formed and cooked taco shell therefrom.

5. Taco shell forming and cooking apparatus as recited in claim 4 wherein each said forming member is connected to a preceding and a succeeding forming member by a connecting means which allows the spacing between adjacent forming members to freely vary between a predetermined minimum separation and a predetermined maximum separation.

6. Taco shell forming and cooking apparatus as recited in claim 5 wherein said certain other rods are longer than said belt is wide and said certain rods are longer than said certain other rods, said certain other rods and said certain rods being positioned alternatingly along the length of said belt.

7. Taco shell forming and cooking apparatus as recited in claim 1 wherein said cooking chamber includes a tank filled with cooking oil and wherein said conveyor means is disposed within said tank.

8. Taco shell forming and cooking apparatus as recited in claim 1 wherein said indexing fingers include a rod engaging shoulder for maintaining a predetermined separation between said rod and said wedge-shaped element.

9. Taco shell forming and cooking apparatus as recited in claim 1 wherein each of said wedge-shaped elements includes a nose bar extending along its apex and means for intermittently separating said nose bar from the remainder of the wedge-shaped element to discharge a formed and cooked taco shell therefrom.

10. Taco shell forming and cooking apparatus as recited in claim 1 wherein each said forming member is connected to a preceding and a succeeding forming member by a connecting means which allows the spacing between adjacent forming members to freely vary between a predetermined minimum separation and a predetermined maximum separation.

11. Taco shell forming and cooking apparatus as recited in claim 1 wherein said certain rods are longer than said belt is wide and said certain other rods are longer than said certain rods, said certain rods and said certain other rods being positioned alternatingly along the length of said belt.

* * * * *